United States Patent
Joensson

(10) Patent No.: US 8,867,830 B2
(45) Date of Patent: Oct. 21, 2014

(54) IMAGE PROCESSING METHOD FOR RECOVERING DETAILS IN OVEREXPOSED DIGITAL VIDEO FOOTAGE OR DIGITAL STILL IMAGES

(71) Applicant: Michael Donvig Joensson, Redondo Beach, CA (US)

(72) Inventor: Michael Donvig Joensson, Redondo Beach, CA (US)

(*) Notice: Subject to any disclaimer, the term of this patent is extended or adjusted under 35 U.S.C. 154(b) by 194 days.

(21) Appl. No.: 13/706,356

(22) Filed: Dec. 6, 2012

(65) Prior Publication Data

US 2013/0194504 A1 Aug. 1, 2013

Related U.S. Application Data

(60) Provisional application No. 61/567,530, filed on Dec. 6, 2011.

(51) Int. Cl.
*G06K 9/00* (2006.01)
*G06T 5/00* (2006.01)
*G06T 5/20* (2006.01)

(52) U.S. Cl.
CPC ....... *G06T 5/001* (2013.01); *G06T 2207/20012* (2013.01); *G06T 2207/10016* (2013.01); *G06T 5/20* (2013.01); *G06T 5/008* (2013.01); *G06T 2207/10024* (2013.01)
USPC .......................................... 382/162; 382/167

(58) Field of Classification Search
CPC ........... G06T 5/001; G06T 5/008; G06T 5/20; G06T 2207/20012; G06T 2207/10016; G06T 2207/10024
USPC ........... 382/162, 167, 254, 274; 348/607, 612
See application file for complete search history.

(56) References Cited

U.S. PATENT DOCUMENTS

| 8,326,073 B2* | 12/2012 | Chan et al. | 382/260 |
| 2009/0225183 A1* | 9/2009 | Tamura | 348/222.1 |
| 2010/0040300 A1* | 2/2010 | Kang et al. | 382/255 |

* cited by examiner

*Primary Examiner* — Brian Le

(57) ABSTRACT

The present method relates to digital color image processing, in particular restoration and recovery of lost contrast and details in highlights due to overexposure or clipping by reconstructing components based on the signal remaining in at least one non-clipped signal component.

13 Claims, 1 Drawing Sheet

Input frame $p^{in}$

| $p^{in}_{(0,0)}$ | $p^{in}_{(1,0)}$ | .. | .. | .. |
|---|---|---|---|---|
| $p^{in}_{(0,1)}$ | $p^{in}_{(1,1)}$ | .. | .. | .. |
| $p^{in}_{(0,2)}$ | .. | .. | .. | .. |
| .. | .. | .. | .. | $p^{in}_{(w,h)}$ |

Processor

Computer program to perform highlight recovery

FIG. 1. Input frame $p^{in}$
| $p^{in}_{(0,0)}$ | $p^{in}_{(1,0)}$ | .. | .. | .. |
|---|---|---|---|---|
| $p^{in}_{(0,1)}$ | $p^{in}_{(1,1)}$ | .. | .. | .. |
| $p^{in}_{(0,2)}$ | .. | .. | .. | .. |
| .. | .. | .. | .. | $p^{in}_{(w,h)}$ |
FIG. 2. Processor
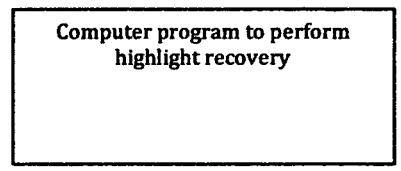
Computer program to perform highlight recovery
FIG. 3. Output frame $p^{out}$
| $p^{out}_{(0,0)}$ | $p^{out}_{(1,0)}$ | .. | .. | .. |
|---|---|---|---|---|
| $p^{out}_{(0,1)}$ | $p^{out}_{(1,1)}$ | .. | .. | .. |
| $p^{out}_{(0,2)}$ | .. | .. | .. | .. |
| .. | .. | .. | .. | $p^{out}_{(w,h)}$ |

IMAGE PROCESSING METHOD FOR RECOVERING DETAILS IN OVEREXPOSED DIGITAL VIDEO FOOTAGE OR DIGITAL STILL IMAGES

CROSS REFERENCE TO RELATED APPLICATION

This application claims the benefit of U.S. Provisional Application No. 61/567,530, filed Dec. 6, 2011.

BACKGROUND

The present invention relates to digital color image enhancement and in particular restoration and recovery of lost contrast and details in highlights due to overexposure or clipping in images and footage recorded digitally with smart phones equipped with a camera, dedicated digital cameras (DLSR, compact cameras) or digital video cameras and thereby extending the usable dynamic range.

Loss of detail and contrast in highlights is a well-known and undesirable phenomenon among practitioners such as photographers and videographers.

Due to inherent limitations of the recording device, such as limited dynamic range, device design choices made in respect to exposure evaluation, and processing methodology, video footage, such as encoded MP4, H264, and AVCHD, or still images such as JPEG and TIFF, often exhibit unintentional loss of detail and contrast in highlights.

The present method rely on the novel observation that pixels in an overexposed area of an image often contain some valid signal residual in at least one color component and thereby offer an opportunity to restore said overexposed areas of an image with a visually pleasing result. The method is believed to be novel in respect to its application to highly processed and compressed low-bit data that is characteristically available with file formats such as JPEG and video files such as H264, AVCHD encoded files.

The invention is used with computer software used for digital video editing or editing of digital still photographs providing a user interface and display to validate the result of parameter changes. The invention can also be used and implemented as a processing step in an image acquisition device without any user intervention.

Various ad-hoc techniques are well known to alleviate loss of highlight details:
1. Premeditated under-exposure during acquisition. The exposure is then gained in a controlled fashion in a post-processing environment in order to gain back the overall and intentional brightness of the scene without causing overexposure or clipping. The main disadvantage of this approach is that the resulting image will usually exhibit more noise throughout the tonal range especially in shadow areas.
2. Use of a photographic gradation filter in from of the lens so that highlight detail in, for instance, the sky is preserved.

A common approach, especially for digital cameras, is to offer a RAW setting that will record images in a so-called RAW file. Such RAW files contain minimally processed data from the imaging sensor. RAW files are so named because they are not yet processed and therefore are not ready to be printed or displayed. RAW images are processed by a RAW converter where precise adjustments, such as exposure, highlight recovery can be performed before conversion to a regular image file format such as JPEG for storage, printing, or further manipulation. The main disadvantage of such RAW images is that they are not immediately available for display or sharing, such as uploading to social media services or web galleries (i.e. Facebook, Flicker) without first having to undergo RAW conversion. It is well known in the art of RAW conversion to restore highlight detail and contrast based on the minimally processed data available in the RAW file. Typically RAW data will is high-bit (10-16 bit) and have not undergone any color processing thereby making the effort of restoring highlight information a much more attainable and predictable task.

Another common approach is to use so-called HDR techniques. HDR is a range of methods to provide higher dynamic range from the imaging process. Non-HDR cameras acquire images at one exposure level with a limited contrast range. This results in the loss of detail in highlights or shadow areas of a scene, depending on whether the camera had a low or high exposure setting. HDR compensates for this loss of detail by acquiring multiple images at different exposure levels and intelligently blend them together to produce an image that covers the full tonal range without loss of details or contrast. The main disadvantage of using HDR techniques is that they are limited in scope to mainly static subject matter. For instance, if the subject is moving in-between two consecutive exposures it will cause an undesirable "ghosting" effect when such two images are blended together.

SUMMARY OF INVENTION

It the purpose of the present invention to provide a color image processing method to restore and recovery highlight detail and contrast in a simple and efficient manner.

The present method rely on the novel observation that pixels in an overexposed area of an image often contain some valid signal content in at least one color component and there by offer an opportunity to restore said overexposed areas of an image with a visually pleasing result. By appropriate scaling of each component of the pixels in said area with ratio between the least exposed component of the pixels and the luminance value of the pixels the details and contrast of the overexposed or clipped area can be perceptually restored. Said ratio establishes the recoverable range, which in turn implies that if all of the components in the color pixel are overexposed no restoration or recovery will be attainable with the present method. Calculating the appropriate scaling factor for each component involves calculating the recoverable range and in turn adjust said scaling factor based on the luminance value of the pixel so that only such pixels which luminance value is in the highlights are changed. A local contrast difference between the pixel and a weighted average of neighboring pixels is calculated and used to appropriately increase the local contrast of restored pixels.

The method is believed to be novel in respect to its application to compressed low-bit data that is characteristically available with file formats such as JPEG and video files such as H264, AVCHD or ProRes encoded files.

It is well known in the art of RAW file conversion to employ a methodology for scaling pixel components that are subject to overexposure or clipping when appropriate adjustments are applied during the RAW conversion. However, such RAW conversion methods rely on the fact that the pixels have undergone little or no prior processing in terms of scaling or color adjustment such as white balancing, gamma, tonal and color corrections and are as such not suitable for images such as JPEG-encoded files or video footage which have already undergone such color adjustments.

When adjusting images from file formats such as JPEG or video footage such as encoded as H264, AVCHD, known software editing solutions can only unsatisfactorily lower the general level in the highlights while making no attempts at recovering lost details or contrast.

BRIEF DESCRIPTION OF DRAWINGS

FIG. 1. An input frame $p^{in}$.
FIG. 2. A computer program implementing this algorithm.
FIG. 3. A resulting output frame $p^{out}$.
The above-identified drawing figures set forth a preferred embodiment.

DETAILED DESCRIPTION OF A PREFERRED EMBODIMENT

A digital image processing method for restoring and recovering highlight detail in a digital image frame divided into pixels holding color pixel component values where $p_{(x,y)}^{in}$ is an input pixel and the resulting $p_{(x,y)}^{out}$ an output pixel where both $p_{(x,y)}^{in}$ and $p_{(x,y)}^{out}$ are normalized [0.0; 1.0] color vectors of (red, green, blue) components (r, g, b), Comprising the steps of For each selected pixel $p_{(x,y)}^{in}$ in the input frame:
a. Calculate luminance $l_{(x,y)}^{in}$ of pixel $p_{(x,y)}^{in}$ $$l_{(x,y)}^{in} = p_{(x,y)}^{in} \cdot \begin{bmatrix} k_1 \\ k_2 \\ k_3 \end{bmatrix}$$

where ($k_1$, $k_2$, $k_3$) are the luminance coefficients. Luminance is calculated according to an established norm such as Rec. 709 which forms luminance using R'G'B' coefficients $k_1$=0.2126, $k_2$=0.7152, and $k_3$=0.0722 b. Calculate local weighted average of luminance $$l_{(x,y)}^{avg} = \frac{\sum_{n=-w}^{w}\sum_{m=-w}^{w} f(n, m, l_{(x,y)}^{in}, l_{(x+n,y+m)}^{in}) l_{(x+n,y+m)}^{in}}{\sum_{n=-w}^{w}\sum_{m=-w}^{w} f(n, m, l_{(x,y)}^{in}, l_{(x+n,y+m)}^{in})}$$

A weighted average of $(2w)^2$ neighbouring luminance values where f is the weighning function such as a gaussain f iter function c. Find minimum component of $p_{(x,y)}^{in}$ $$c_{(x,y)} = \min(p_{(x,y)r}^{in}, p_{(x,y)g}^{in}, p_{(x,y)b}^{in})$$

The minimum component (r, g or b) of vector $p_{(x,y)}^{in}$ d. Calculate ratio between the minimum component and the luminance (the recoverable range)

$$s_{(x,y)} = \frac{c_{(x,y)}}{l_{(x,y)}^{in}}$$

e. Calculate the local luminance difference (the local contrast level)

$$\text{delta}_{(x,y)} = (l_{(x,y)}^{in} - l_{(x,y)}^{avg}) k$$

where k is a scalar user parameter ≥0.0 determining the influence of the influence or strength of the local contrast.

f. Calculate the blending factor $b_{(x,y)}$. The higher the luminance value the closer $b_{(x,y)}$ will be to 1.0 and the less of the original pixel value will be preserved.

$$b_{(x,y)} = \frac{l_{(x,y)}^{in4}}{l_{(x,y)}^{in4} + \Phi}(1.0 + \Phi)j$$

where j is a scalar user parameter determining the strength of the blending and $\Phi$ is a small positive constant determining the slope of the transfer function.

g. Calculate the correction scaling factor for $p_{(x,y)}^{in}$ $$\text{scale}_{(x,y)} = \frac{(l_{(x,y)}^{in} + \text{delta}_{(x,y)}) s_{(x,y)}}{l_{(x,y)}^{in}} b_{(x,y)} + 1.0 - b_{(x,y)}$$

h. Apply the correction scaling factor to the input vector $p_{(x,y)}^{in}$ and assign the result to $p_{(x,y)}^{out}$ $$p_{(x,y)}^{out} = p_{(x,y)}^{in} \text{scale}_{(x,y)}$$

The invention is used with computer software used for digital video editing or editing of digital still photographs. Usually a user interface would be provided in order to visually validate the result of parameter changes.

The invention can also be used and implemented as a processing step in an image capture device without any user intervention. In such case the optional parameters j in [002f] and k in [002e] could be hardcoded constants.

While all elements of this method are necessary the method, a computational simplification can be accomplished by omitting the step in [002b] concerning the calculation of the average luminance value and define $\text{delta}_{(x,y)}$=1.0. This will in effect neglect the local contrast enhancement obtainable in [002e].

The invention claimed is:

1. A digital image processing method for restoring and recovering highlight detail in a digital image frame divided into pixels holding color pixel component values, comprising the steps of selecting a first pixel,
calculating the luminance value of the selected first pixel,
finding the minimum color component of the selected first pixel,
defining a pixel window around the selected first pixel,
calculating the weighted average luminance value within the window,
calculating the recovery ratio between the minimum color component of the selected first pixel and the luminance value of the selected first pixel,
calculating the local luminance difference between the luminance value of the selected first pixel and the weighted average luminance value within the window,
calculating the blending ratio as a function of the absolute luminance value,
calculating a pixel component value based on selected first pixel and the recovery ratio and the local luminance difference and the blending ratio, and
assigning the calculated pixel component value to the selected first pixel.

2. A method according to claim 1, wherein the weights of the weighted average is equal to one.

3. A method according to claim 1, wherein the relation to the selected first pixel determines the weights of the weighted average.

4. A method according to claim 1, wherein the window around the selected first pixel only include the selected first pixel.

5. A method according to claim 1, wherein the image comprise of RGB color components.

6. A method according to claim 1, wherein the image comprise of CMY color components.

7. A method according to claim 1, where in the image frame originates from a JPEG formatted file.

8. A method according to claim 1, where the image frame originates from a TIFF formatted file.

9. A method according to claim 1, where the image frame originates from a H264 encoded video file.

10. A method according to claim 1, where the image frame orginates from a AVCHD encoded video file.

11. A method according to claim 1, where the image frame orginates from a ProRes encoded video file.

12. An image processing apparatus with a processor that is adapted for performing a method according to any of the preceding claims.

13. An image recording system with a processor that is adapted for performing a method according to any of the preceding claims.

* * * * *